/ Patented Nov. 4, 1941

UNITED STATES PATENT OFFICE 2,261,113

SEPARATING SULPHUROUS ACID FROM ALUMINUM SULPHITES

Wilhelm Fulda and Wilhelm Wrigge, Lautawerk, and Heinrich Logemann, Schlebusch, Germany, assignors to Th. Goldschmidt Corporation, New York, N. Y., a corporation of Delaware No Drawing. Application April 21, 1939, Serial No. 269,234. In Germany November 28, 1936

3 Claims. (Cl. 23—143)

This invention relates to separating sulphurous acid from aluminum sulphites; and it comprises a process of treating an aluminum sulphite, such as basic aluminum sulphite, for the recovery of sulphurous acid, said process comprising heating a slurry of aluminum sulphite in an aqueous liquor in a closed vessel to temperatures exceeding 100° C. while supplying sufficient heat to said solution to cause the evolution of substantially the entire sulphur dioxide content of said aluminum sulphite to be quickly completed, steam and sulphur dioxide being vented from said closed vessel at such a rate that superatmospheric pressures are maintained above said solution; all as more fully hereinafter set forth and as claimed.

In the recovery of alumina from clays by the sulphite extraction process liquors containing aluminum sulphite are obtained. These liquors are usually first hydrolyzed to obtain basic aluminum sulphite and the latter is then decomposed by boiling it with water or a salt solution, with the recovery of alumina and sulphur dioxide, the latter being recovered in the form of sulphurous acid. This decomposition reaction in the past has been accomplished by heating the aluminum sulphite and aqueous liquor to temperatures not exceeding 100° C. and at atmospheric pressures or below. In some cases a vacuum has been maintained over the solution in order to assist in the removal of the evolved $SO_2$.

In conducting these decomposition reactions in the described manner it has been found that the precipitated alumina invariably contains a certain amount of residual $SO_2$ as an impurity. Thus, it has been found impossible to reduce the quantity of $SO_2$ present in the alumina from this process much below 2.25 per cent based on the weight of the alumina present. Another disadvantage of this prior process is the large consumption of heat required owing to the fact that a quantity of water must be evaporated during the expulsion of the $SO_2$ amounting to at least 300 times the quantity of $Al_2O_3$ recovered in the process. The yield of $SO_2$ has been low.

It has been known that normal aluminum sulphite, when in solution, decomposes upon heating first into basic aluminum sulphite, which is relatively insoluble, and then into sulphur dioxide and alumina. It has also been known that these decomposition reactions are promoted by rise of temperature. But owing to the fact that the decomposition curve of basic aluminum sulphite substantially flattens out at a temperature of 100° C. it has hitherto been supposed that it would not be feasible to attempt to conduct this decomposition at more elevated temperatures.

We have found that certain highly important advantages are secured when aluminum sulphite is decomposed by heating it in contact with water or an aqueous salt solution at temperatures above 100° C. and at superatmospheric pressures. The aluminum sulphite is substantially less stable at these higher temperatures and it decomposes much more rapidly, the decomposition reaction being thereby accelerated. But surprisingly we have found that the quantity of heat required to complete the decomposition reaction is only a small fraction of that required at lower temperatures and at atmospheric pressures, this being due to the fact that the quantity of water required to be evaporated during the decomposition is substantially less. In fact we have found that, when operating conditions are maintained in accordance with the preferred embodiment of this invention, the quantity of water evaporated is within the range of only 1 to 4 times the weight of the alumina recovered in the process. Needless to say this results in a substantial saving in the cost of the decomposition reaction.

We have further found that the use of more elevated temperatures causes the decomposition of the $SO_2$ into sulphur and $SO_3$ with a consequent loss of $SO_2$, but that this loss can be largely obviated by completing the decomposition reaction as quickly as possible, that is, by supplying sufficient heat to the pressure vessel or autoclave in order that the $SO_2$ and steam may be vented rapidly without lowering the temperature and pressure below those desired. The higher the temperature used in the autoclave, the more rapidly the $SO_2$ must be evolved in order to keep losses of $SO_2$ within reasonable limits.

With long heating periods of from 2 to 3 hours the losses of $SO_2$ amount to 8 per cent or more at temperatures of about 120° C. At a temperature of 155° C. as much as 50 per cent of the $SO_2$ is decomposed if the decomposition period in the autoclave is prolonged to 3 hours or more. At these and at still higher temperatures, ranging up to about 175° C., the decomposition reaction must be completed and the $SO_2$ completely evolved within a period of less than about 10 minutes if an economical yield of $SO_2$ is to be obtained. Some method of flash heating is essential if these higher temperatures are used. For best results in our process the aluminum sulphite must be rapidly heated in contact with an aqueous liquor at temperatures within the range of about 120° to 175° C., the $SO_2$ and steam being vented as rapidly as possible at pressures ranging from about 2 to 10 atmospheres gauge pressure, the conditions of heating being such that, at the higher temperatures the decomposition period does not substantially exceed 10 minutes. Even at the lower temperatures the decomposition period is preferably maintained below 60 minutes.

Our invention can be described in somewhat more detail by reference to the following specific examples which represent practical embodiments thereof.

*Example 1*

In one run we employed a mixture of 325 parts of basic aluminum sulphite and 300 parts of water. The aluminum sulphite contained 11.8 per cent of $Al_2O_3$ and 3.8 per cent $SO_2$, that is, 32.2 per cent $SO_2$ based on the weight of the $Al_2O_3$. This slurry was heated in an autoclave to a temperature of 120° C., the $SO_2$ and steam being withdrawn at a rate keeping the pressure at about 1.6 atmospheres gauge pressure. After heating for 2 hours, only 46 per cent of the $SO_2$ had been eliminated from the residue of $Al_2O_3$. It was found that 8 per cent of the $SO_2$ had been decomposed and partially oxidized. 38 per cent was recovered. In this operation, however, it was found that the quality of water distilled off amounted to only 7 times the weight of the $Al_2O_3$ recovered which, of course, represents an important saving in comparison with operations at atmospheric pressures. The analysis of the residue showed 13.1 per cent of $Al_2O_3$ and 2.28 per cent of $SO_2$, that is 17.4 per cent based on the weight of the $Al_2O_3$.

Other similar runs have shown that, when the decomposition of the aluminum sulphite is conducted within the temperature range of about 120° to 125° C. and at pressures not exceeding 2 atmospheres, only about 40 to 47 per cent of the original $SO_2$ can be eliminated from the $Al_2O_3$ residue. At these temperatures, of course, the decomposition of the $SO_2$ is rather low which is an advantage. A heating period of from 2 to 3 hours can be employed without excessive decomposition of the $SO_2$.

In order to obtain an $Al_2O_3$ residue containing less sulphur it is necessary to conduct the decomposition reaction of the sulphite at higher temperatures. We have found it possible, for example, to eliminate at least 90 per cent of the $SO_2$ from the residues provided that the autoclave is heated within the range of about 150° to 160° C. and the pressure is maintained at about 7 atmospheres gauge pressure. This is shown by the following examples.

*Example 2*

A mixture of 300 parts of basic aluminum sulphite with 220 parts of water was heated in an autoclave at a temperature of 155° C., the pressure being maintained at about 6.8 atmospheres gauge pressure. The rate of heating used in this test was low so that the test lasted 3 hours. While the original sulphite contained 14.2 per cent of $Al_2O_3$ and 3.4 per cent of $SO_2$ (24 per cent based on the weight of the $Al_2O_3$), the residue obtained was found to analyze 16.5 per cent $Al_2O_3$ and 0.16 per cent of $SO_2$ (0.96 per cent based on the $Al_2O_3$). It is therefore evident that 96 per cent of the $SO_2$ was eliminated from the residue in this test. The water evaporated amounted only to 3 times the weight of the $Al_2O_3$ recovered. But it was found that 50 per cent of the $SO_2$ was decomposed, only 46 per cent being recovered.

It is evident therefore that the procedure described was not efficient owing to the large losses of $SO_2$ by oxidation. The losses of $SO_2$ can be greatly reduced by conducting the heating in such manner that the $SO_2$ is expelled and the decomposition of the sulphite completed as quickly as possible. This can be accomplished, for example, by heating the autoclave at a more rapid rate and venting the $SO_2$ and steam at a correspondingly rapid rate. This is illustrated by the following example.

*Example 3*

In this test we started with the same mixture of aluminum sulphite and water which was used in the preceding example. A temperature of 155° C. and pressure of 6.8 atmospheres was used as before. But the autoclave was heated much more vigorously. It took about 20 minutes for the autoclave to come to temperature and within the following 10 minutes no less than 94 per cent of the $SO_2$ contained in the sulphite was expelled, the decomposition reaction being completed within this short period. No less than 82 per cent of the $SO_2$ was recovered, only 12 per cent being lost through decomposition. The quantity of water distilled amounted to 3 times the weight of the $Al_2O_3$. An analysis of the residue showed 17.3 per cent of $Al_2O_3$ and 0.26 per cent $SO_2$ (1.5 per cent based on the weight of the $Al_2O_3$).

It is evident from the above that it is possible to substantially eliminate $SO_2$ impurities in the $Al_2O_3$ recovered from aluminum sulphite and at the same time recover up to 80 per cent or more of the $SO_2$ by rapidly heating the salt with water and allowing the liberated gas to escape quickly at a pressure of about 7 atmospheres. The quantity of water evaporated can be kept to a minimum by operating in this manner. It is also evident that a short heating period is essential if a maximum recovery of $SO_2$ is to be obtained, since otherwise substantial losses will be experienced through oxidation.

We have found that the water used in the above examples can be replaced by aqueous salt solutions. Such solutions raise the boiling points of the decomposition liquors which is of advantage and also tend to decrease the losses due to oxidation. Any inert compatible salt can be employed of which sodium sulphate and sodium chloride are examples. We have also found that the decomposition of the $SO_2$ can be lowered by the addition of reducing agents to the decomposition liquor. Any reducing agents can be employed which are inert towards the $SO_2$ and $Al_2O_3$ but which tend to prevent the oxidation of $SO_2$ to $SO_3$ or to reduce $SO_3$ to $SO_2$. These reducing agents may be gaseous, liquid or solid. We usually prefer to use reducing salts which are soluble in the decomposition liquor. Examples of these are hydrazine sulphate and sodium hydrosulphite. Reducing gases such as carbon monoxide and hydrogen may be used. The use of reducing agents in this manner substantially increases the yield of $SO_2$ by preventing losses through oxidation.

While we have described what we consider to be the most advantageous embodiments of our process it is evident that various details of the procedures described can be varied without departing from the purview of this invention. For example it is possible to conduct our process in a continuous manner and this method has some advantages. The mixture of water and aluminum sulphite may be passed continuously into the top of a pressure vessel which is advantageously of the vertical type. The sulphite and water mixture is raised to its boiling point almost instantaneously as it strikes the body of heated liquor and the sulphite is decomposed very rapidly, the $SO_2$ being quickly evolved from the upper layers of the liquor in the vessel. Decomposition is complete before the slowly descending liquor reaches the bottom of the vessel from which point it is withdrawn together with the $Al_2O_3$ precipitate. Any other type of pressure still can be utilized in which it is possible to heat the liquor quickly, that is to produce a flash heating. As stated previously, the more rapid the rate of heating the higher the temperature which can be employed in the process and the more complete the elimination of the $SO_2$ from the $Al_2O_3$.

The basic aluminum sulphite, which is employed as a starting material in the methods which have been described, can be prepared by any of the known methods of producing this material. When the basic sulphite is precipitated from a solution of aluminum sulphite, it is not necessary that it be separated from the residual liquor, but the mixture of liquor and precipitate can be immediately treated in accordance with the process of the present invention.

Other modifications of our process falling within the scope of the following claims will be immediately evident to those skilled in this art.

What we claim is:

1. The process which comprises heating finely divided aluminum sulphite in a closed reaction zone in contact with a body of an aqueous liquor to a temperature of about 155° C. and withdrawing substantially the entire $SO_2$ content of the aluminum sulphite, as well as steam from said reaction zone in such manner that a pressure of about 7 atmospheres is maintained in said zone and recovering the residue of $Al_2O_3$.

2. In the separation of $SO_2$ from aluminum sulphite, the process which comprises heating a solution of aluminum sulphite under conditions producing the precipitation of basic aluminum sulphite, heating the resulting slurry of basic aluminum sulphite in a closed reaction zone at superatmospheric pressures and at temperatures ranging from about 155° to 175° C. while withdrawing substantially the entire $SO_2$ content of said reaction zone, and recovering the resulting $Al_2O_3$.

3. In the separation of $SO_2$ from aluminum sulphite, the process which comprises heating an aqueous slurry of basic aluminum sulphite in a closed reaction zone maintained under superatmospheric pressures and at temperatures ranging from about 120° to 175° C. while supplying sufficient heat to the reaction zone to cause the basic aluminum sulphite to become substantially completely decomposed into $SO_2$ and $Al_2O_3$ within a period ranging from a few minutes up to about 2 hours, the time and temperature being so correlated that the shorter decomposition periods are employed with the higher temperatures, withdrawing $SO_2$ and steam evolved during the process, and recovering the resulting $Al_2O_3$.

WILHELM FULDA.
WILHELM WRIGGE.
HEINRICH LOGEMANN.